United States Patent
Shiramatsu

(10) Patent No.: US 11,185,997 B2
(45) Date of Patent: Nov. 30, 2021

(54) ROBOT

(71) Applicant: FANUC CORPORATION, Yamanashi (JP)

(72) Inventor: Daisuke Shiramatsu, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 125 days.

(21) Appl. No.: 16/718,410

(22) Filed: Dec. 18, 2019

(65) Prior Publication Data

US 2020/0238544 A1    Jul. 30, 2020

(30) Foreign Application Priority Data

Jan. 29, 2019   (JP) .............................. JP2019-013024

(51) Int. Cl.
| | | |
|---|---|---|
| *B25J 17/00* | (2006.01) | |
| *B25J 17/02* | (2006.01) | |
| *B25J 18/00* | (2006.01) | |
| *B25J 19/00* | (2006.01) | |
| *F16H 57/04* | (2010.01) | |

(52) U.S. Cl.
CPC .......... *B25J 19/0062* (2013.01); *B25J 18/00* (2013.01); *F16H 57/0464* (2013.01); *F16H 57/0495* (2013.01)

(58) Field of Classification Search
CPC ... B25J 19/0062; B25J 18/00; F16H 57/0464; F16H 57/0495
See application file for complete search history.

(56) References Cited

U.S. PATENT DOCUMENTS

| | | | | |
|---|---|---|---|---|
| 6,701,220 | B1* | 3/2004 | Lundstrom | B25J 9/102 318/562 |
| 2005/0133305 | A1* | 6/2005 | Okada | B25J 19/0062 184/65 |
| 2010/0154579 | A1* | 6/2010 | Nakamura | B25J 19/0054 74/490.05 |

(Continued)

FOREIGN PATENT DOCUMENTS

| | | |
|---|---|---|
| CN | 107538515 A | 1/2018 |
| CN | 108994866 A | 12/2018 |

(Continued)

OTHER PUBLICATIONS

Japanese Office Action dated Mar. 2, 2021, in connection with corresponding JP Application No. 2019-013024 (9 pp., including machine-generated English translation).

*Primary Examiner* — Jake Cook
(74) *Attorney, Agent, or Firm* — Maier & Maier, PLLC

(57) ABSTRACT

A robot includes: a first arm having a first body, a first housing fixed to the first body, and a first gear transmitting power to a rotary member supported by the first housing so as to be rotatable; a second arm supporting the first arm and having a second body, a second shaft having a second gear meshing with the first gear, and a second bearing supporting the second shaft so that the second shaft is rotatable relative to the second body; and a channel in the arms. An inlet of the channel is formed in an outer surface of the first body, an outlet of the channel opening into a space in which an outer peripheral surface of the second shaft and the second bearing are arranged inside the second arm, the channel extending from the inlet to the outlet through inside of the first body.

6 Claims, 5 Drawing Sheets

(56) References Cited

U.S. PATENT DOCUMENTS

2014/0091023 A1* 4/2014 Long .................. F16N 7/36
                                                  210/167.08

FOREIGN PATENT DOCUMENTS

| EP | 0 553 363 A1 | 8/1993 |
|---|---|---|
| JP | H03-281192 A | 12/1991 |
| JP | H05-060181 A | 3/1993 |
| JP | H05-046864 Y | 12/1993 |
| JP | H07-075992 A | 3/1995 |
| JP | 2011-149460 A | 8/2011 |
| JP | 2012-007637 A | 1/2012 |

* cited by examiner

ROBOT

CROSS-REFERENCE TO RELATED APPLICATIONS

This application claims the benefit of Japanese Patent Application No. 2019-013024, the content of which is incorporated herein by reference.

FIELD

The present invention relates to a robot.

BACKGROUND

Conventionally, a robot provided with a channel for supplying a lubricant to a mechanical part such as a reducer, a gear, or a bearing has been known (see Japanese Examined Utility Model Application, Publication No. Hei 5-046864, Japanese Unexamined Patent Application, Publication No. 2012-007637 and Japanese Unexamined Patent Application, Publication No. 2011-149460, for example).

SUMMARY

One aspect of the present disclosure is a robot including: a first arm; a second arm supporting the first arm; and a lubricant channel provided in the first arm and the second arm, in which: the first arm has a first arm main body, a first housing fixed to the first arm main body, and a first gear that transmits power to a rotary member supported by the first housing so as to be rotatable about a first rotary axis; the second arm has a second arm main body, a second shaft having a second gear that meshes with the first gear at an axial angle of 90 degrees, and a second bearing that supports the second shaft so that the second shaft is rotatable relative to the second arm main body; and an inlet of the channel is formed in an outer surface of the first arm main body, an outlet of the channel opening into a space in which an outer peripheral surface of the second shaft and the second bearing are arranged inside the second arm, the channel extending from the inlet to the outlet through inside of the first arm main body.

DETAILED DESCRIPTION

Figure 1:
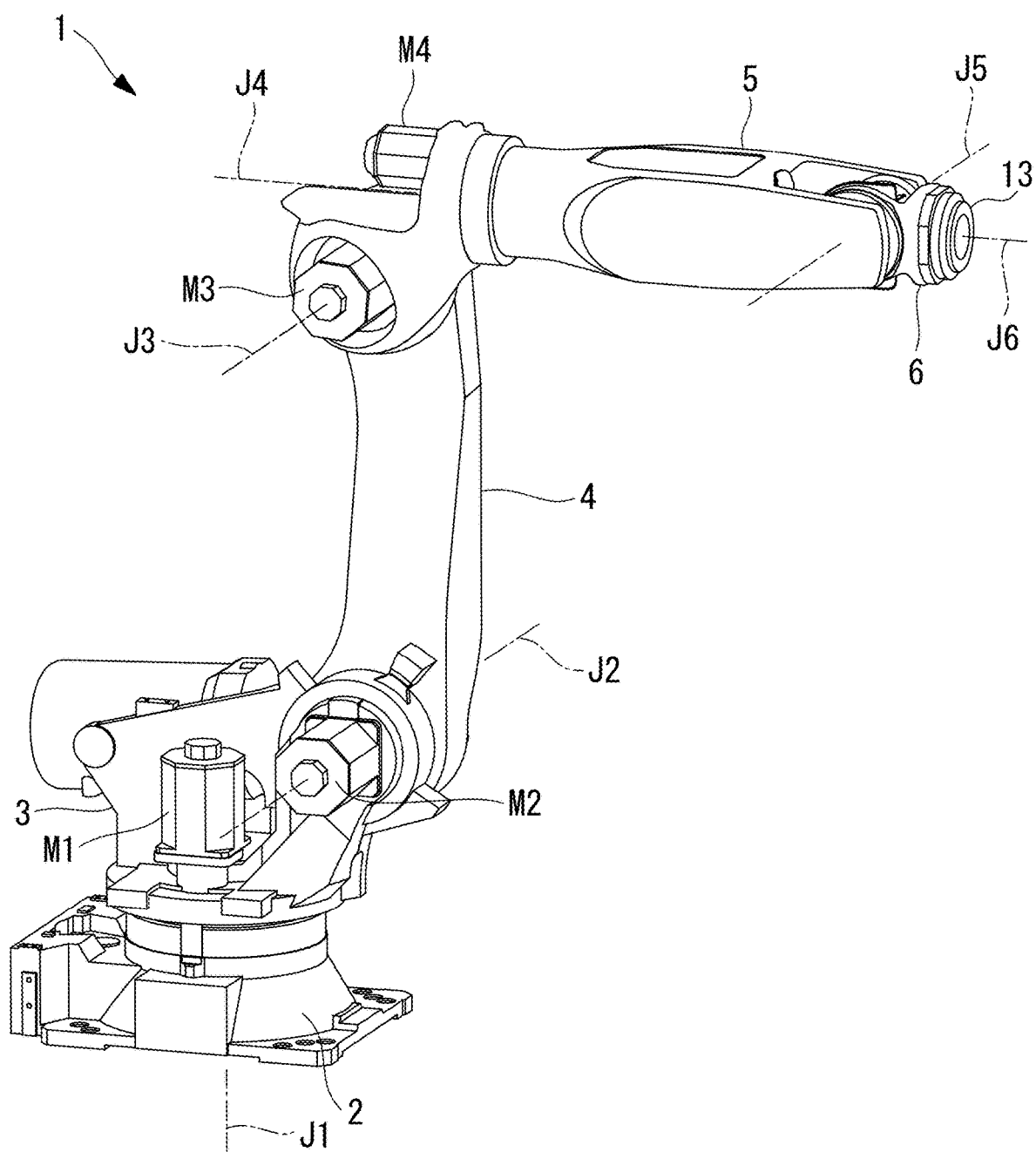
FIG. 1 is an external view of a robot according to an embodiment of the present invention.

Hereinafter, a robot according to an embodiment of the present invention will be described with reference to the drawings. As shown in FIG. 1, a robot 1 according to the embodiment is a six-axis vertical articulated robot. The robot 1 includes a base 2, a turning portion 3, a lower arm 4, an upper arm (second arm) 5, and an arm tip end portion (first arm) 6.

The base 2 is fixed on a floor surface. The turning portion 3 is disposed on the base 2, and is supported by the base 2 so as to be rotatable about a vertical first axis J1. A base end portion of the lower arm 4 is supported by the turning portion 3 so as to be rotatable about a horizontal second axis J2.

A base end portion of the upper arm 5 is supported by a tip end portion of the lower arm 4 so as to be rotatable about a horizontal third axis J3. Additionally, a base end portion of the upper arm 5 is supported by a tip end portion of the lower arm 4 so as to be rotatable about a fourth axis J4 which is the longitudinal axis of the upper arm 5. A base end portion of the arm tip end portion 6 is supported by a tip end portion of the upper arm 5 so as to be rotatable about a horizontal fifth axis (second rotary axis) J5. Additionally, the arm tip end portion 6 supports a wrist flange (rotary member) 13 so that the wrist flange 13 is rotatable about a sixth axis (first rotary axis) J6 perpendicular to the fifth axis J5.

Figure 2:
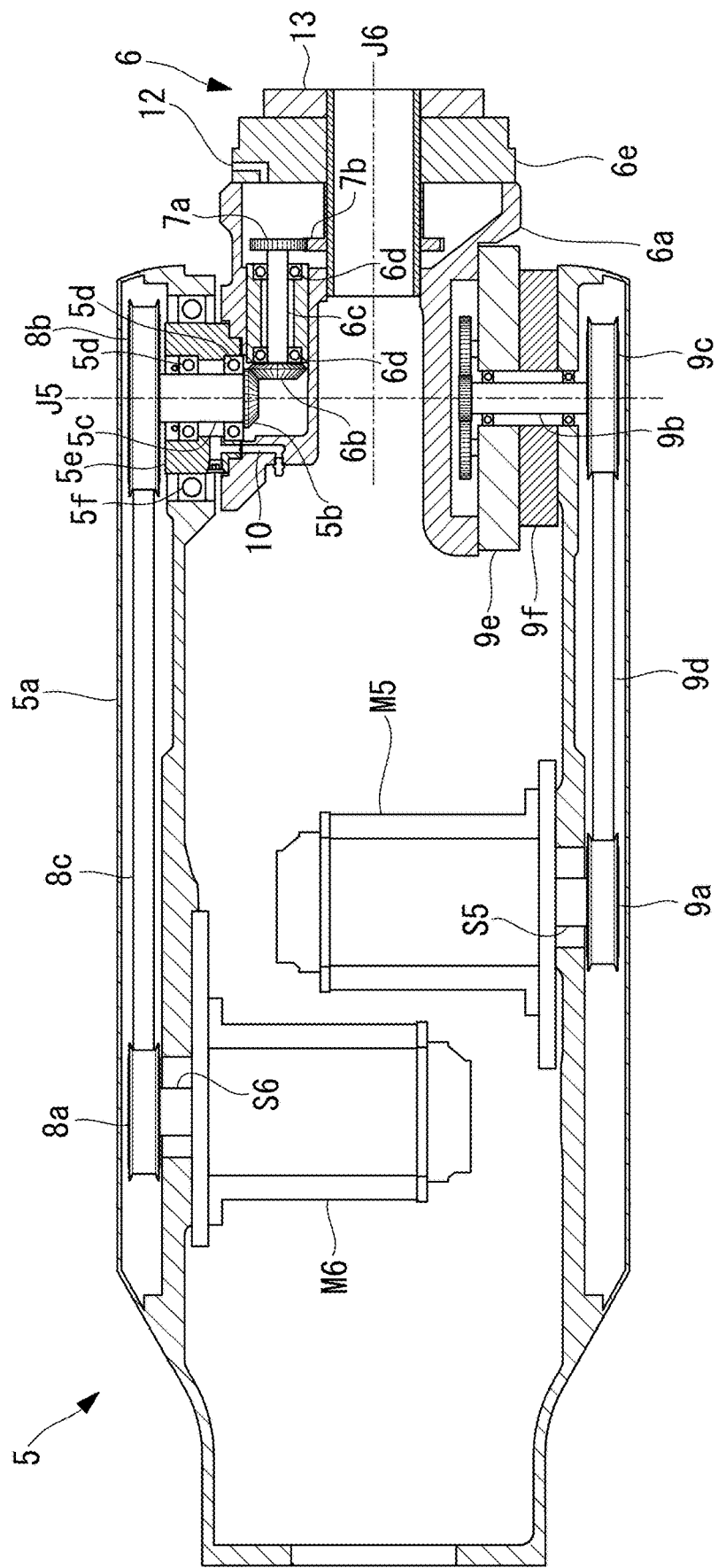
FIG. 2 is a diagram showing an internal structure of an upper arm and an arm tip end portion of the robot of FIG. 1.

Additionally, the robot 1 includes servo motors M1, M2, M3, M4, M5, and M6 that rotate the turning portion 3, the lower arm 4, the upper arm 5, the arm tip end portion 6, and the wrist flange 13 about the joint axes J1, J2, J3, J4, J5, and J6, respectively. As shown in FIG. 2, the servo motor M5 for rotating the arm tip end portion 6 about the fifth axis J5 and the servo motor M6 for rotating the wrist flange 13 about the sixth axis J6 are arranged inside the upper arm 5.

Note that the robot 1 may be a vertical articulated robot having numbers of axes other than six.

Figure 3:
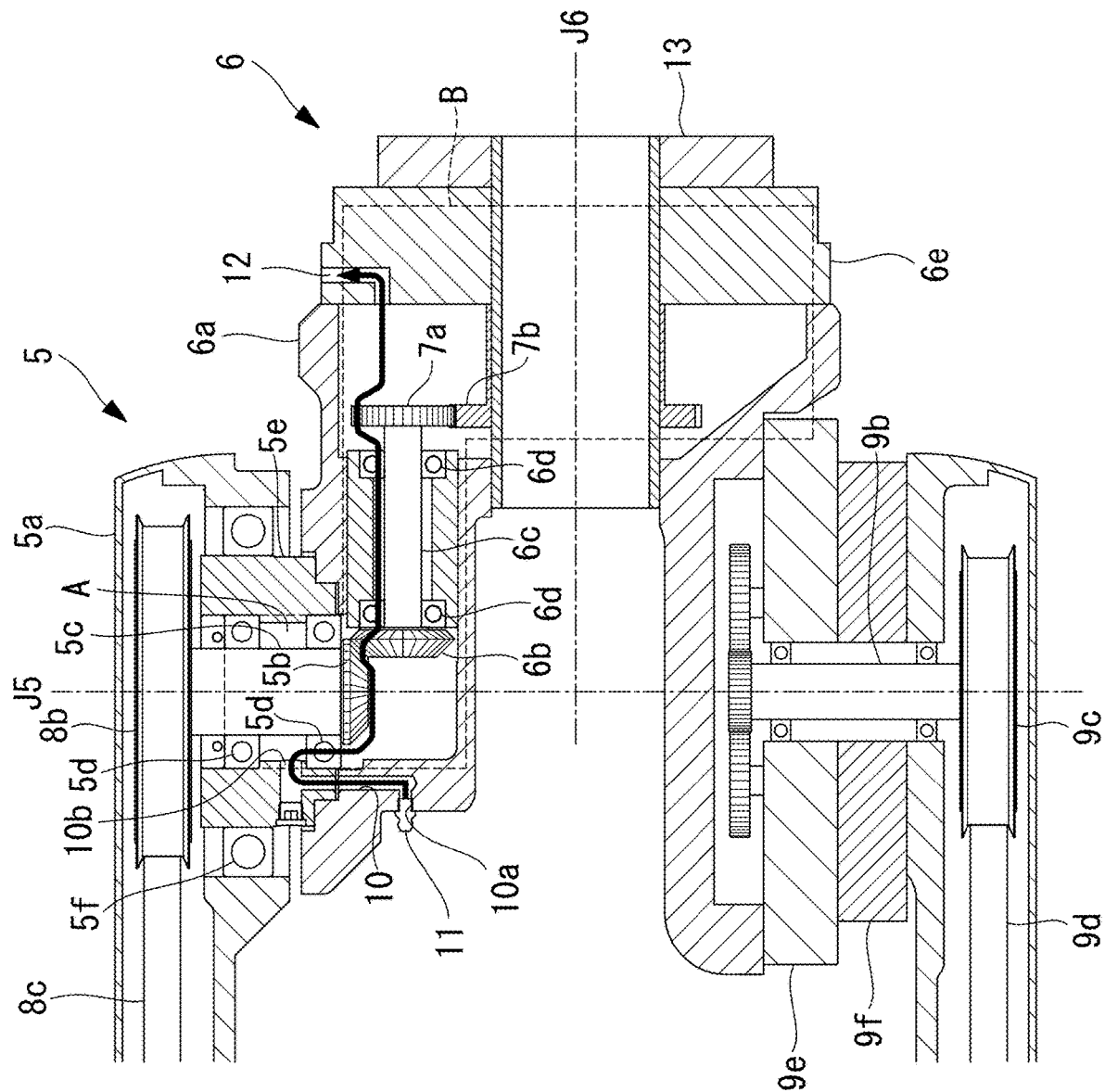
FIG. 3 is a partial enlargement of FIG. 2.

FIGS. 2 and 3 show an example of an internal structure of the upper arm 5 and the arm tip end portion 6. As shown in FIGS. 2 and 3, the upper arm 5 has an arm main body (second arm main body) 5a, a shaft (second shaft) 5c having a gear (second gear) 5b on one end, two bearings (second bearings) 5d, and a housing (second housing) 5e.

The arm main body 5a is an external part of the upper arm 5 extending along the fourth axis J4. The cylindrical housing 5e is arranged coaxially with the fifth axis J5 in a tip end portion of the arm main body 5a, and is supported by a bearing 5f so as to be rotatable about the fifth axis J5 relative to the arm main body 5a. The shaft 5c and the bearings 5d are arranged in a space inside an inner peripheral surface of the housing 5e. The shaft 5c is arranged coaxially with the fifth axis J5 in a position separated from the sixth axis J6 in a radial direction perpendicular to the sixth axis J6. The gear 5b is provided on one end of the shaft 5c on the sixth axis J6 side, and is formed around the same axis as the shaft 5c.

Each bearing 5d is arranged in an annular space A between an outer peripheral surface of the shaft 5c and the inner peripheral surface of the housing 5e. The two bearings 5d are spaced apart from each other in the longitudinal direction of the shaft 5c. The shaft 5c is supported by the two bearings 5d so as to be rotatable about the fifth axis J5 relative to the housing 5e. The number of the bearings 5d may be three or more.

The arm tip end portion 6 has a tip end portion main body (first arm main body) 6a, a shaft (first shaft) 6c having a gear (first gear) 6b on one end, two bearings (first bearings) 6d, and a housing (first housing) 6e.

The housing 6e is a cylindrical member arranged coaxially with the sixth axis J6, and is fixed with the tip end portion main body 6a. The wrist flange 13 is supported by the housing 6e so as to be rotatable about the sixth axis J6. Additionally, the tip end portion main body 6a is fixed with the housing 5e.

The shaft 6c and the bearings 6d are arranged in the tip end portion main body 6a. The shaft 6c is arranged in parallel with the sixth axis J6 in a position separated from the sixth axis J6 in a radial direction perpendicular to the sixth axis J6. The gear 6b is provided at the base end of the shaft 6c, and is formed around the same axis as the shaft 6c. The gear 5b and the gear 6b are bevel gears meshing with each other at an axial angle of 90 degrees. The axial angle is an angle formed by the axis of the gear 5b and the axis of the gear 6b. A gear 7a is fixed on the tip end of the shaft 6c, and a gear 7b is fixed to the housing 6e coaxially with the sixth axis J6. The gear 7b transmits power to the gears inside the housing 6e, and rotates the wrist flange 13 supported by the housing 6e about the sixth axis J6. The gear 7a and the gear 7b are spur gears meshing with each other. Note that the housing 6e, the wrist flange 13, and the gear 7b may have a hollow portion as in FIGS. 2 and 3, or may be solid.

The bearings 6d support the shaft 6c, so that the shaft 6c is rotatable about the longitudinal axis relative to the tip end portion main body 6a. The two bearings 6d are spaced apart from each other in the longitudinal direction of the shaft 6c. The number of the bearings 6d may be three or more.

An output shaft S6 of the servo motor M6 for the sixth axis J6 is connected to the shaft 5c by a power transmission member. In the example of FIGS. 2 and 3, the output shaft S6 is parallel to the fifth axis J5, and the power transmission member has a pulley 8a fixed to the output shaft S6, a pulley 8b fixed to the other end of the shaft 5c, and a belt 8c wound around the pulleys 8a and 8b. Rotation of the output shaft S6 is transmitted to the wrist flange 13 through the power transmission members 8a, 8b, and 8c, the shaft 5c, the gear 5b, the gear 6b, the shaft 6c, the gear 7a, and the gear 7b, whereby the wrist flange 13 rotates about the sixth axis J6 relative to the housing 6e.

The power transmission member may be a combination other than the combination of the pulleys 8a and 8b and the belt 8c. For example, the power transmission member may be a combination of gears that transmit rotation from the output shaft S6 to the shaft 5c. Alternatively, the output shaft S6 may be directly connected with the shaft 5c.

An output shaft S5 of the servo motor for the fifth axis J5 is connected to the tip end portion main body 6a by a power transmission member. In the example of FIGS. 2 and 3, the output shaft S5 is parallel to the fifth axis J5, and the power transmission member has a pulley 9a fixed to the output shaft S5, a shaft 9b formed around the same axis as the fifth axis J5, a pulley 9c fixed on one end of the shaft 9b, a belt 9d wound around the pulleys 9a and 9c, a housing 9e to which power is transmitted from a gear provided on the other end of the shaft 9b, and a flange 9f rotatably supported by the housing 9e. The housing 9e is a cylindrical member arranged coaxially with the fifth axis J5, and is fixed with the tip end portion main body 6a. The shaft 9b transmits power to the gear inside the housing 9e, and rotates the flange 9f supported by the housing 9e about the fifth axis J5. The flange 9f is fixed with the arm main body 5a.

Rotation of the output shaft S5 is transmitted to the tip end portion main body 6a through the power transmission members 9a, 9b, 9c, 9d, 9e, and 9f, whereby the tip end portion main body 6a and the housing 6e rotate integrally about the fifth axis J5. At this time, the housing 5e, too, rotates integrally with the tip end portion main body 6a and the housing 6e about the fifth axis J5 relative to the arm main body 5a.

As shown in FIG. 3, a lubricant channel 10 is provided in the upper arm 5 and the arm tip end portion 6. An inlet 10a of the channel 10 is formed in a base end surface of the tip end portion main body 6a. An outlet 10b of the channel 10 is formed in an inner peripheral surface (inner surface) of the housing 5e and opens into the space A. The channel 10 is provided in the tip end portion main body 6a and the housing 5e, and extends from the inlet 10a to the outlet 10b through the insides of the tip end portion main body 6a and the housing 5e. The inlet 10a is a grease inlet for injecting a lubricant into the upper arm 5 and the arm tip end portion 6, and a grease nipple 11 is provided in the inlet 10a. As mentioned earlier, the housing 5e and the tip end portion main body 6a are fixed to each other, and the channel 10 from the inlet 10a to the outlet 10b formed in the housing 5e and the tip end portion main body 6a does not change regardless of rotation of the arm tip end portion 6 and the wrist flange 13 about the joint axes J5 and J6.

A grease outlet 12 for discharging the lubricant from the inside of the arm tip end portion 6 is formed in an outer surface of the arm tip end portion 6. The grease outlet 12 is positioned closer to the tip end than any of the bearings 6d. In the example of FIGS. 2 and 3, the grease outlet 12 is formed in an outer surface of the housing 6e. The gears 5b, 6b, 7a, and 7b, the shafts 5c and 6c, and the bearings 5d and 6d are arranged inside an enclosed area B enclosed by a seal member or the like between the outlet 10b and the grease outlet 12. In the enclosed area B, there are gaps that allow passage of the lubricant around the mechanical parts such as the gears 5b, 6b, 7a, and 7b, the shafts 5c and 6c, and the bearings 5d and 6d, for example.

Next, a method of supplying the lubricant to the mechanical parts inside the upper arm 5 and the arm tip end portion 6 will be described. A grease gun is connected to the grease nipple 11, and a lubricant such as grease or oil is injected from the grease gun into the channel 10 through the grease nipple 11 of the grease inlet 10a. An arrow in FIG. 3 indicates a general route of the lubricant from the grease inlet 10a to the grease outlet 12. The lubricant moves inside the channel 10 from the grease inlet 10a toward the outlet 10b, flows into the space A inside the enclosed area B from the outlet 10b, and is supplied to an outer peripheral surface of the shaft 5c and the bearings 5d arranged in the space A.

Since the space A is a part of the enclosed area B, the lubricant moves toward the grease outlet 12 from the space A through the gaps in the enclosed area B. The gear 5b, the gear 6b, the shaft 6c, the bearings 6d, the gear 7a, and the gear 7b are positioned on the route of the lubricant between the space A and the grease outlet 12. Hence, the lubricant is also supplied to the gears 5b, 6b, 7a, and 7b, the shaft 6c, and the bearings 6d.

As has been described, according to the embodiment, an upstream portion of the channel 10 is provided in the tip end portion main body 6a of the arm tip end portion 6, and a downstream portion of the channel 10 is provided in the housing 5e of the upper arm 5. The tip end portion main body 6a and the housing 5e do not rotate relative to each other about the joint axes J5 and J6. Hence, the lubricant can be supplied reliably to the mechanical parts 5b, 5c, and 5d of the upper arm 5, from the grease inlet 10a of the arm tip end portion 6 adjacent to the upper arm 5 through the channel 10. That is, even when it is difficult to provide a grease inlet in a tip end portion of the upper arm 5 due to design limitations such as difficulty in ensuring space, it is possible to reliably supply a lubricant to the mechanical parts 5b, 5c, and 5d in the tip end portion of the upper arm 5 and prevent defective conditions in the mechanical parts 5b, 5c, and 5d due to lack of lubrication.

Figure 5:
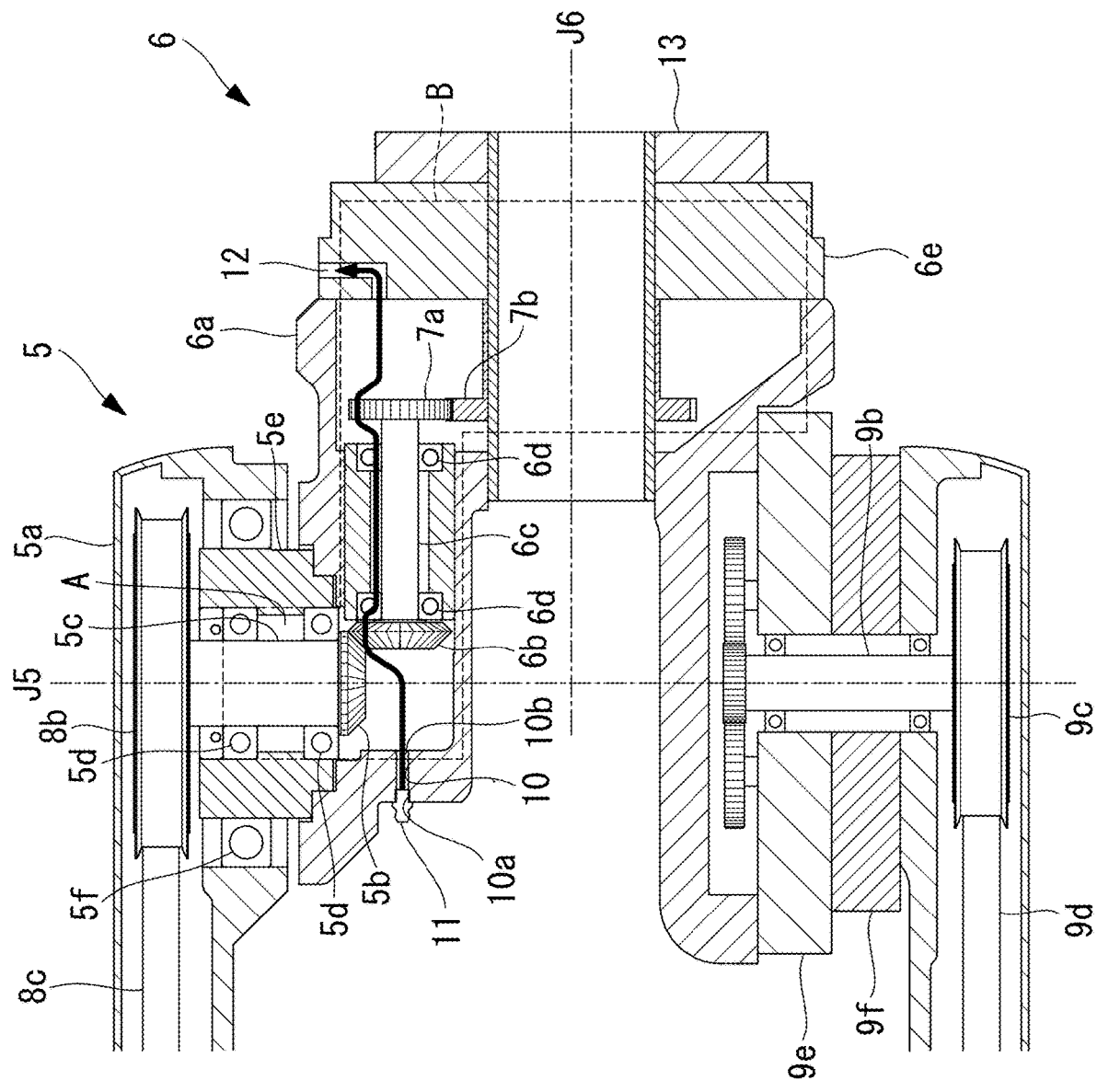
FIG. 5 is a partial enlargement showing an internal structure an upper arm and an arm tip end portion of a comparative example.

Additionally, in the enclosed area B, the lubricant moves toward the grease outlet 12. Hence, if the lubricant is fed into the enclosed area B from the grease inlet 10a according to the injection direction of the lubricant into the grease inlet 10a as shown in FIG. 5, the lubricant moves along a route (see arrow) connecting the grease inlet 10a and the grease outlet 12, and the lubricant hardly reaches the shaft 5c and the bearings 5d which are positioned off the route.

According to the embodiment, since the outlet 10b of the channel 10 opens into the space A in which the outer peripheral surface of the shaft 5c and the bearings 5d are arranged, it is possible to reliably supply the lubricant to the shaft 5c and the bearings 5d as well.

While the outlet 10b is formed in the inner peripheral surface of the housing 5e in the above embodiment, the outlet 10b may be formed in other parts, as long as the outlet 10b opens into the space A in which the outer peripheral surface of the shaft 5c and the bearings 5d are arranged.

Figure 4:
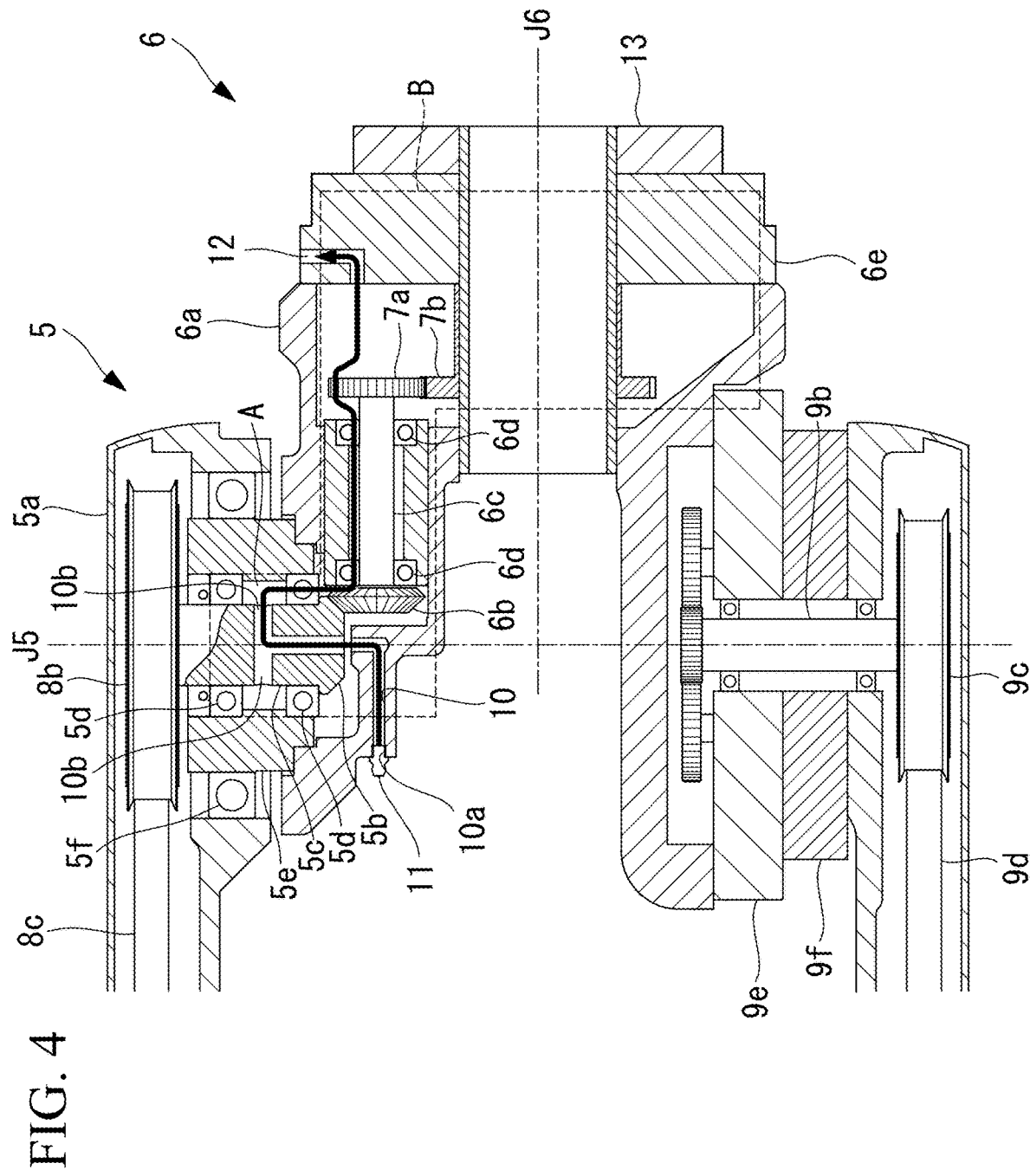
FIG. 4 is a partial enlargement showing an internal structure of a modification of the upper arm and the arm tip end portion of the robot of FIG. 1.

For example, as shown in FIG. 4, an outlet 10b may be formed in an outer peripheral surface of a shaft 5c. In this modification, a channel 10 is provided in a tip end portion main body 6a and the shaft 5c, and extends to the outlet 10b through the insides of the tip end portion main body 6a and the shaft 5c. Specifically, a downstream portion of the channel 10 formed in the shaft 5c opens on an end surface of the gear 5b on the sixth axis J6 side and the outer peripheral surface of the shaft 5c. An upstream portion of the channel 10 formed in the tip end portion main body 6a opens on an outer peripheral surface of the tip end portion main body 6a in a position facing the opening of the gear 5b. While the number of outlets 10b may be just one, multiple outlets 10b arranged in the circumferential direction may be formed in the outer peripheral surface of the shaft 5c. Such a channel 10, too, can reliably supply a lubricant to mechanical parts 5b, 5c, and 5d in an upper arm 5 from an arm tip end portion 6.

The invention claimed is:

1. A robot comprising:
   a first arm;
   a second arm supporting the first arm; and
   a lubricant channel provided in the first arm and the second arm, wherein:
   the first arm has
      a first arm main body,
      a first housing fixed to the first arm main body, and
      a first gear that transmits power to a rotary member supported by the first housing so as to be rotatable about a first rotary axis;
   the second arm has
      a second arm main body,
      a second shaft having a second gear that meshes with the first gear at an axial angle of 90 degrees, and
      a second bearing that supports the second shaft so that the second shaft is rotatable relative to the second arm main body;
   an inlet of the channel is formed in an outer surface of the first arm main body, an outlet of the channel opening into a space in which an outer peripheral surface of the second shaft and the second bearing are arranged inside the second arm, the channel extending from the inlet to the outlet through inside of the first arm main body;
   the second arm supports the first arm so that the first arm is rotatable about a second rotary axis perpendicular to the first rotary axis; and
   the second arm has a second housing storing the second shaft, the second arm main body and the second housing rotatable relative to each other about the second rotary axis.

2. The robot according to claim 1, wherein
the outlet of the channel is formed in an inner surface of the second housing and opens into the space between the inner surface of the second housing and the outer peripheral surface of the second shaft, and
the channel extends from the inlet to the outlet through insides of the first arm main body and the second housing.

3. The robot according to claim 1, wherein
the outlet of the channel is formed in the outer peripheral surface of the second shaft and opens into the space between an inner surface of the second housing and the outer peripheral surface of the second shaft, and
the channel extends from the inlet to the outlet through insides of the first arm main body and the second shaft.

4. A robot comprising:
   a first arm;
   a second arm supporting the first arm; and
   a lubricant channel provided in the first arm and the second arm, wherein:
   the first arm has
      a first arm main body,
      a first housing fixed to the first arm main body, and
      a first gear that transmits power to a rotary member supported by the first housing so as to be rotatable about a first rotary axis,
      a first shaft stored inside the first arm main body and having the first gear,
      a first bearing that supports the first shaft so that the first shaft is rotatable relative to the first arm main body, and
      a grease outlet formed closer to a tip end than the first bearing in an outer surface of the first arm;
   the second arm has
      a second arm main body,
      a second shaft having a second gear that meshes with the first gear at an axial angle of 90 degrees, and
      a second bearing that supports the second shaft so that the second shaft is rotatable relative to the second arm main body;
   an inlet of the channel is formed in an outer surface of the first arm main body, an outlet of the channel opening into a space in which an outer peripheral surface of the second shaft and the second bearing are arranged inside the second arm, the channel extending from the inlet to the outlet through inside of the first arm main body; and
   the first shaft, the first bearing, the second shaft, and the second bearing are arranged inside an enclosed area between the outlet of the channel and the grease outlet.

5. The robot according to claim 1, wherein
the first arm is an arm tip end portion of a vertical articulated robot that supports a wrist flange as the rotary member, and the second arm is an upper arm of the vertical articulated robot.

6. The robot according to claim 4, wherein
the first arm is an arm tip end portion of a vertical articulated robot that supports a wrist flange as the rotary member, and the second arm is an upper arm of the vertical articulated robot.

* * * * *